(12) United States Patent
Watanabe

(10) Patent No.: US 6,385,450 B1
(45) Date of Patent: May 7, 2002

(54) MOBILE COMMUNICATION SYSTEM AND RESOURCE MANAGEMENT METHOD OF THE SAME

(75) Inventor: Hideharu Watanabe, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/338,142

(22) Filed: Jun. 22, 1999

(30) Foreign Application Priority Data

Sep. 18, 1998 (JP) .......................................... 10-265137

(51) Int. Cl.⁷ .......................... H04Q 7/20; H04H 11/00
(52) U.S. Cl. ..................... 455/436; 455/405; 455/423
(58) Field of Search ........................... 455/436, 414, 455/432, 440, 442, 435, 405, 456, 445; 370/238; 705/34, 30, 52, 53, 400, 418; 465/423, 424, 425, 67.1

(56) References Cited

U.S. PATENT DOCUMENTS

| | | | | |
|---|---|---|---|---|
| 5,504,804 A | * | 4/1996 | Widmark et al. | ........... 455/414 |
| 5,815,810 A | * | 9/1998 | Gallant et al. | .............. 455/433 |
| 5,878,026 A | * | 3/1999 | Greenberg et al. | ........... 370/230 |
| 6,038,445 A | * | 3/2000 | Alperovich et al. | .... 455/433 X |
| 6,173,175 B1 | * | 1/2001 | Alazma et al. | .............. 455/423 |
| 6,208,977 B1 | * | 3/2001 | Hernandez et al. | ........... 705/34 |
| 6,311,054 B1 | * | 10/2001 | Korpela | ................... 455/405 X |

FOREIGN PATENT DOCUMENTS

| | | |
|---|---|---|
| JP | 64-17522 | 1/1989 |
| JP | 7-7750 | 1/1995 |
| JP | 9-312662 | 12/1997 |

* cited by examiner

Primary Examiner—Tracy Legree
(74) Attorney, Agent, or Firm—Rosenmant & Colin LLP

(57) ABSTRACT

A mobile communication system includes a route trace unit for actuating a route trace to trace resources of call control in a local station, an inter-station checking unit for checking whether or not the resource becomes an inter-station resource by the inter-station handoff, and an inter-station communication unit for notifying a remote station to actuate a route trace when the resource is the inter-station resource and receiving a result of the route trace from the remote station. Accordingly, when the resources of the call control are the inter-station resources, the route trace automatically extending over a plurality of switching centers can be carried out automatically.

8 Claims, 17 Drawing Sheets

FIG. 7
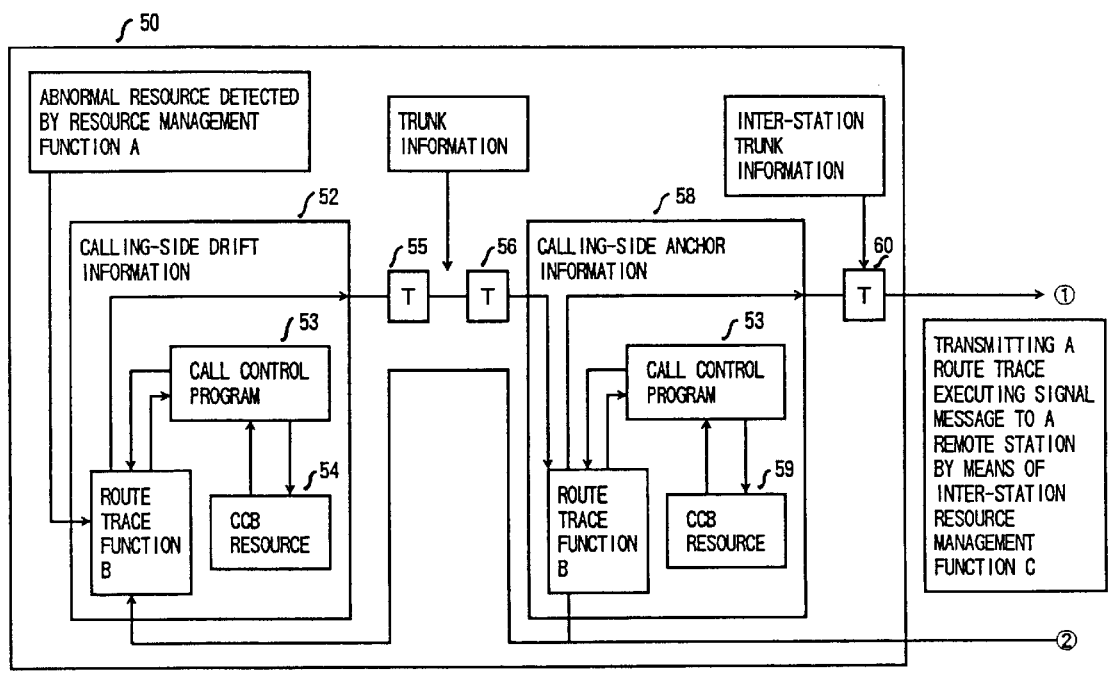
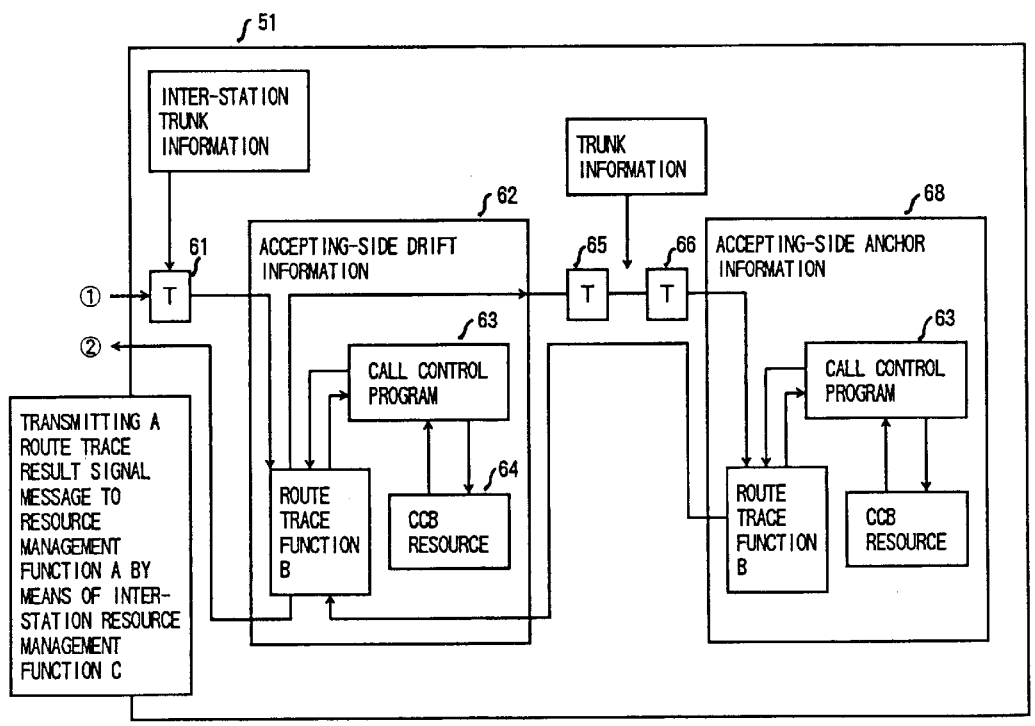

FIG. 8
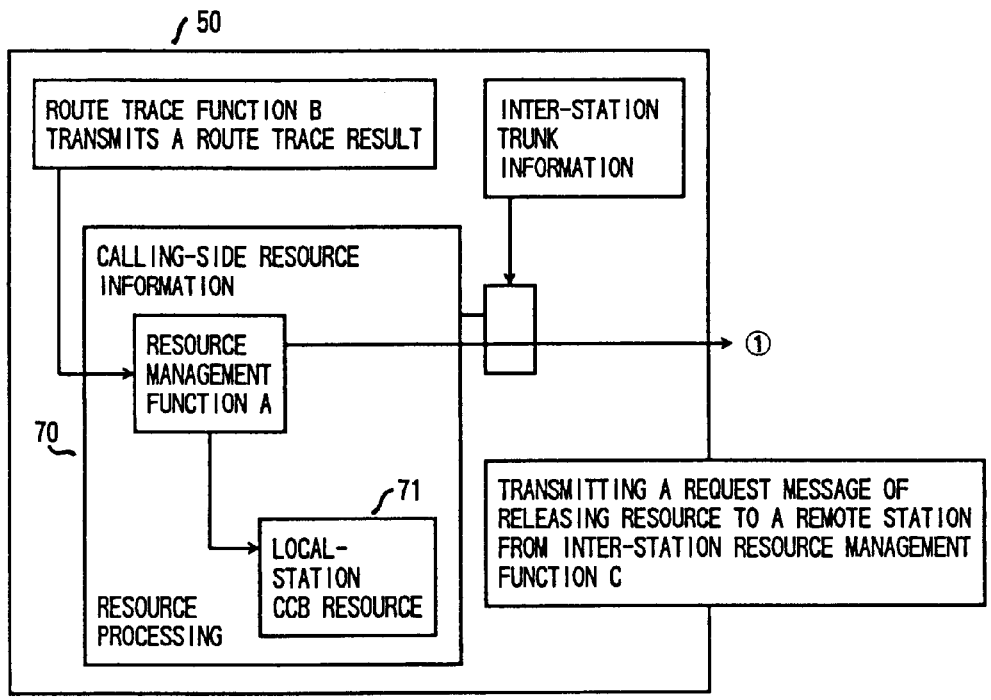
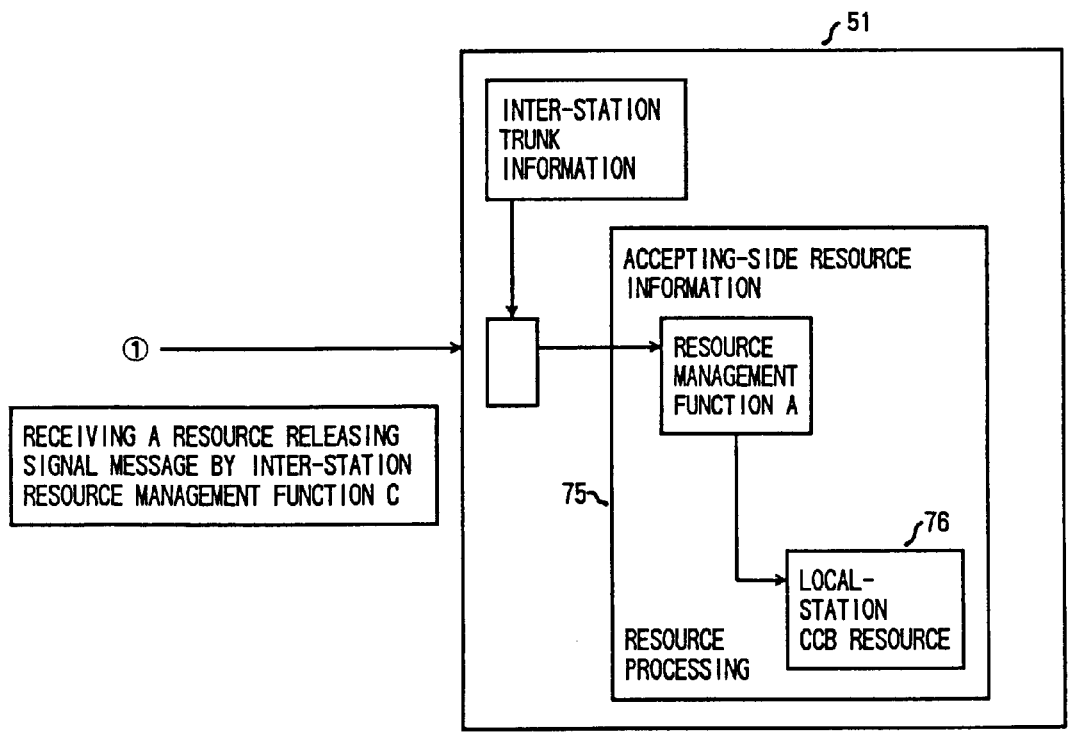

F I G. 1 2
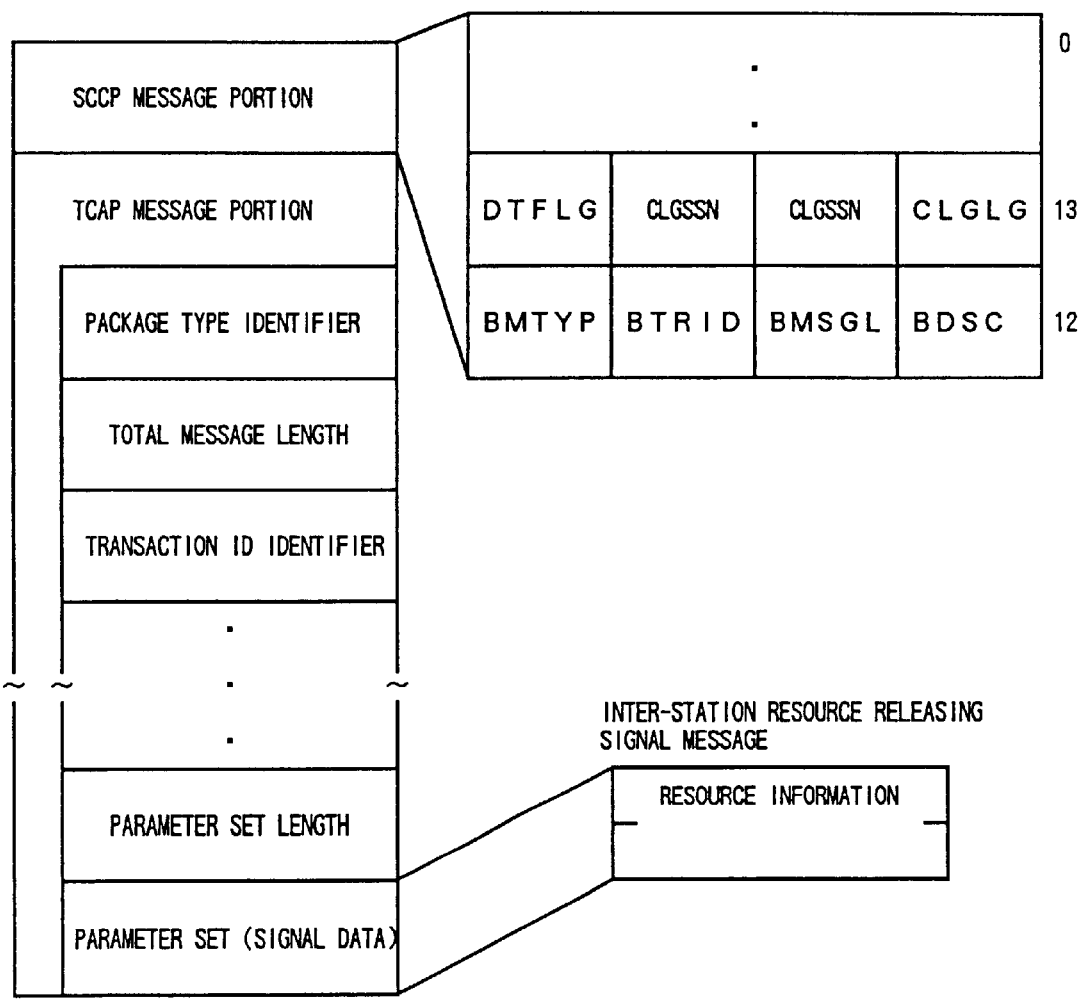

MOBILE COMMUNICATION SYSTEM AND RESOURCE MANAGEMENT METHOD OF THE SAME

BACKGROUND OF THE INVENTION

1. Field of the Invention

The present invention relates to a mobile communication system and a resource management method thereof, and more particularly to a mobile communication system and a resource management method thereof suitable for performing an inter-station handoff extending over a plurality of switching centers.

In the mobile communication system, the inter-station handoff is frequently performed because the number of switching centers has greatly increased with the increasing of subscribers and the enlarging of communication areas.

2. Description of the Related Art

In a conventional mobile communication system, a handoff is performed, which handoff involves switching a connection to different base stations one after another with movement of a mobile station. In particular, in a Code Division Multiple Access (CDMA) which is different from a Frequency-Division Multiple Access (FDMA), a mobile station can communicate with a plurality of base stations in the same frequency. For this reason, while communicating with a base station, the mobile station can communicate with a next (target) base station. Further, the mobile station carries out a soft diversity while maintaining communication with both of the above-mentioned base stations so as to perform a seamless handoff without a short transmission interruption, namely, a soft handoff.

Performing such a handoff may bring about a change in resources of a switching center. The resources are information about a connection of a mobile station which generates a call control and writes the call control into a memory in a call. The resources contain anchor information as fixed information and drift information as variable information corresponding to the anchor information of the mobile station. The handoff may bring about a change in the drift information, such that an abnormality is found, the abnormality being, for example, that a resource to be released is not released or has become an abnormal link.

In a conventional mobile communication system and resource management method thereof, as shown in FIG. 1, a communication between two mobile stations (MS) 21, 22 is carried out through two base station systems (BSS) 12, 14 which are connected to a switching system 10. When a resource A (drift information of a calling side) Is found to be abnormal due to, for example, a long-duration call, a maintainer inputs a route trace command for the resource A to confirm normality of resources B, C and D which are in serial connection in the long-duration call. The route trace functions to trace resources of a call control generated in a calling connection and written into a memory, so as to confirm whether the call is correctly connected or not.

As shown in FIG. 2, in a case in which the resource A is detected as abnormal due to floating (the resource is not being effectively used), the maintainer inputs the route trace command for the abnormal resource A. When the resource A is detected as not being connected to any resource, a process of releasing the resource A is carried out.

According to movement of a mobile station, an inter-station handoff may extend over a plurality of switching centers.

In another conventional mobile communication system and resource management method thereof, as shown in FIG. 3, a communication between two mobile stations (MS) 21, 22 is carried out through two base station systems (BSS) 12, 15 which are connected respectively to two switching systems 10, 11. When a resource A (drift information of a calling side) is detected as abnormal due to, for example, a long-duration call, a maintainer inputs in the switching system 10 a route trace command for the abnormal resource A to confirm normality of resources B, C, D which are in serial connection. In the switching system 10 into which the route trace command has been inputted, the resource B can be detected. However, the route trace cannot be carried out in the switching system 11. If the maintainer does not separately input the route trace command into the switching system 11, normality of the resources C and D cannot be confirmed. Thus, normality of the resources A, B, C and D which have been used in the long-duration call cannot be confirmed automatically by one route trace command.

As shown in FIG. 4, in a case in which an abnormal resource is detected due to floating of the resource C in the switching system 11, even though the maintainer inputs the route trace command into the switching system 10, since the resources A and B are normally connected to each other in the switching system 10, the resources A, B and C cannot be released.

SUMMARY OF THE INVENTION

It is a general object of the present invention to provide a mobile communication system and resource management method thereof, in which the above disadvantages are eliminated.

A more specific object of the present invention is to provide a mobile communication system and resource management method thereof, in which a route trace can be automatically carried out among a plurality of switching centers when a call control of a handoff extends over the switching centers.

The above object of the present invention is achieved by a mobile communication system for performing an inter-station handoff extending over a plurality of switching centers, the mobile communication system comprising: a route trace portion which actuates a route trace so as to trace resources of call control in a local station, an inter-station checking functional portion in which the resources are checked as to whether or not the resource becomes an inter-station resource by the inter-station handoff, and an inter-station communication portion which notifies a remote station to execute a route trace when the resource is the inter-station resource and receives a result of the route trace from the remote station.

Thus, the resource of the call control is route-traced in the local station and is checked as to whether the resource becomes the inter-station resource by the inter-station handoff. When the resource is the inter-station resource, the remote station is notified to execute a route trace and transmits a result of the route trace to the local station. Hence, when the resources of the call control are the inter-station resources, a route trace automatically extending over a plurality of switching centers can be automatically carried out.

The mobile communication system may further comprise a resource releasing portion which releases an abnormal resource detected by the route trace result.

Thus, since the abnormal resource detected by the route trace result is released, the abnormal resource can be automatically released in the local station.

The mobile communication system may be configured so that: the resource releasing portion notifies the remote station through the inter-station communication portion so as to release an abnormal resource detected by the route trace result from the remote station.

Thus, since the remote station is notified to release the abnormal resource detected by the route trace result from the remote station, the abnormal resource in the remote station can be automatically released in a case of inter-station call control.

The mobile communication system may further comprise a resource checking portion which checks the resource and a route trace actuating portion which actuates the route trace if the resource is checked as being abnormal.

Thus, since the resource is checked and the route trace is actuated if the resource is checked as being abnormal, when the abnormality is found, all of the abnormal resources in the local and remote stations can be automatically released.

Further, the above object of the present invention is achieved by a resource management method of the mobile communication system according to the present invention, comprising the steps of: a) actuating a route trace so as to trace resources of call control in a local station, b) checking whether or not each of the resources becomes an inter-station resource by the inter-station handoff; and c) notifying a remote station to execute a route trace when the resource is the inter-station resource and receiving a result of the route trace from the remote station.

Thus, the resource of the call control is route-traced in the local station and is checked as to whether the resource becomes the inter-station resource by the inter-station handoff. When the resource is the inter-station resource, the remote station is notified to execute a route trace and transmits a result of the route trace to the local station. Hence, when the resources of the call control are the inter-station resources, a route trace automatically extending over a plurality of switching centers can be automatically carried out.

The resource management method further comprises the step of d) releasing an abnormal resource detected by the route trace result.

Thus, since the abnormal resource detected by the route trace result is released, the abnormal resource can be automatically released in the local station.

The resource management method further comprises the step of e) signaling the remote station so as to release an abnormal resource detected by the route trace result from the remote station.

Thus, since the remote station is notified to release the abnormal resource detected by the route trace result from the remote station, the abnormal resource in the remote station can be automatically released in a case of inter-station call control.

The resource management method further comprises the step of f) checking whether or not the resource is abnormal and actuating a route trace in the local station if the resource is abnormal.

Thus, since the resource is checked and the route trace is actuated if the resource is checked as being abnormal, when abnormality is found, all of the abnormal resources in the local and remote stations can be automatically released.

BRIEF DESCRIPTION OF THE DRAWINGS

Other objects, features and advantages of the present invention will become more apparent from the following detailed description when read in conjunction with the accompanying drawings, in which:

FIG. 7 is a block diagram showing an example of route trace control according to the present invention;

FIG. 8 is a block diagram showing an example of resource releasing control according to the present invention;

FIG. 12 is a block diagram showing an example of a format of a resource releasing signal message according to the present invention;

DETAILED DESCRIPTION OF THE PREFERRED EMBODIMENTS

Figure 1:
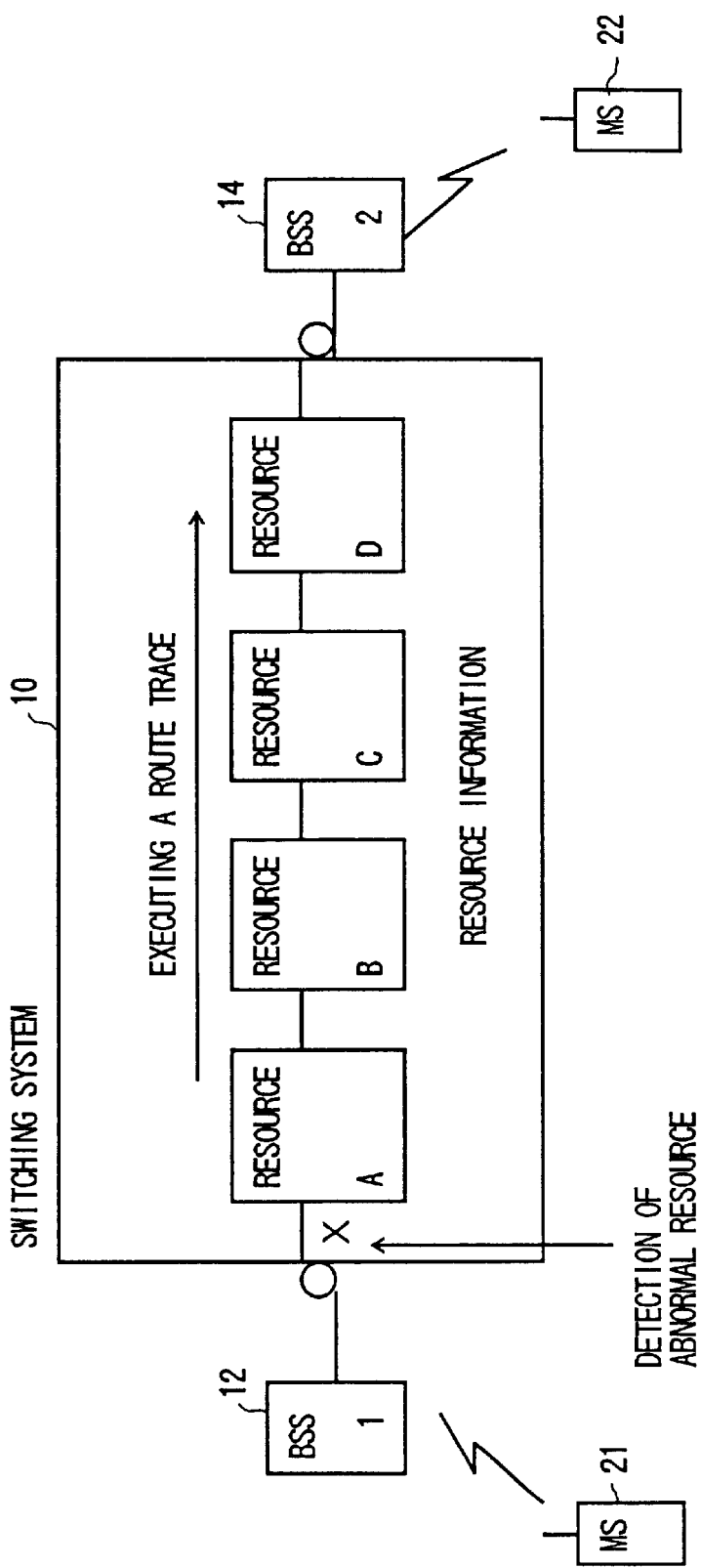
FIG. 1 is a view showing a conventional mobile communication system and resource management method thereof.
Figure 2:
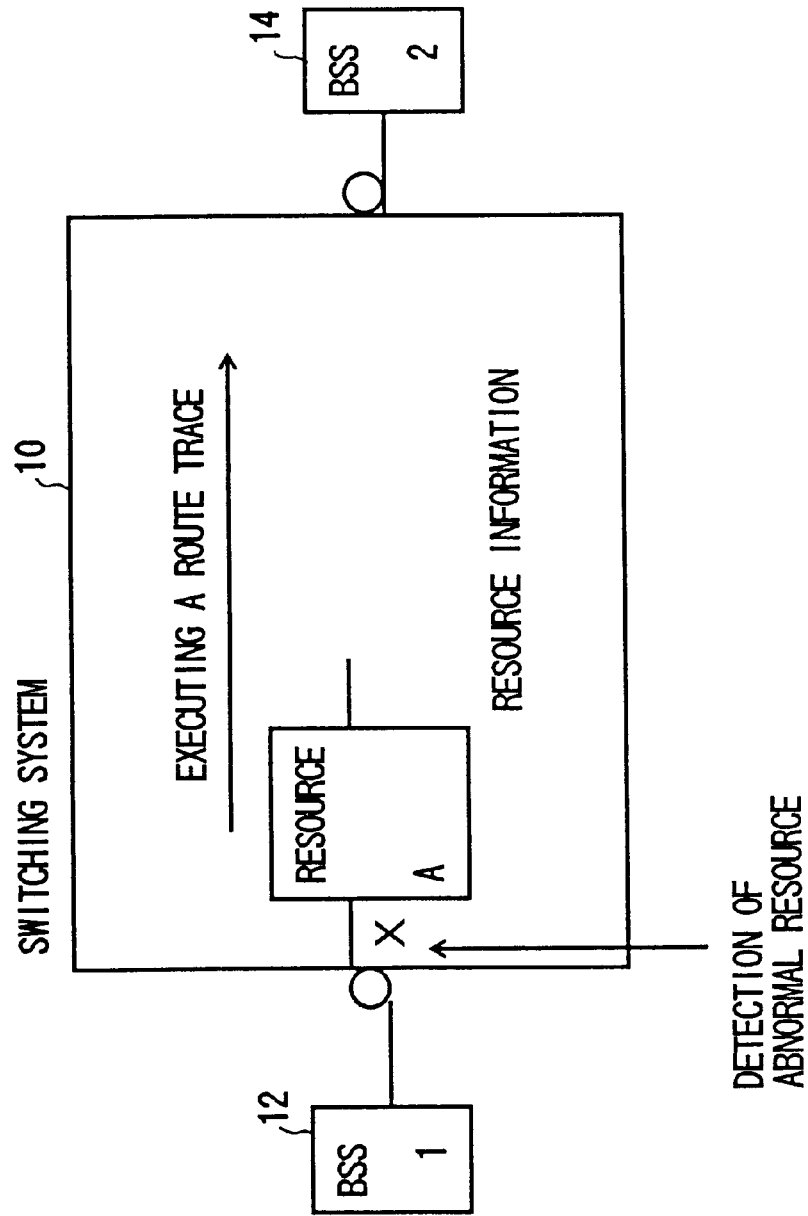
FIG. 2 is a view showing the conventional mobile communication system and resource management method thereof.
Figure 3:
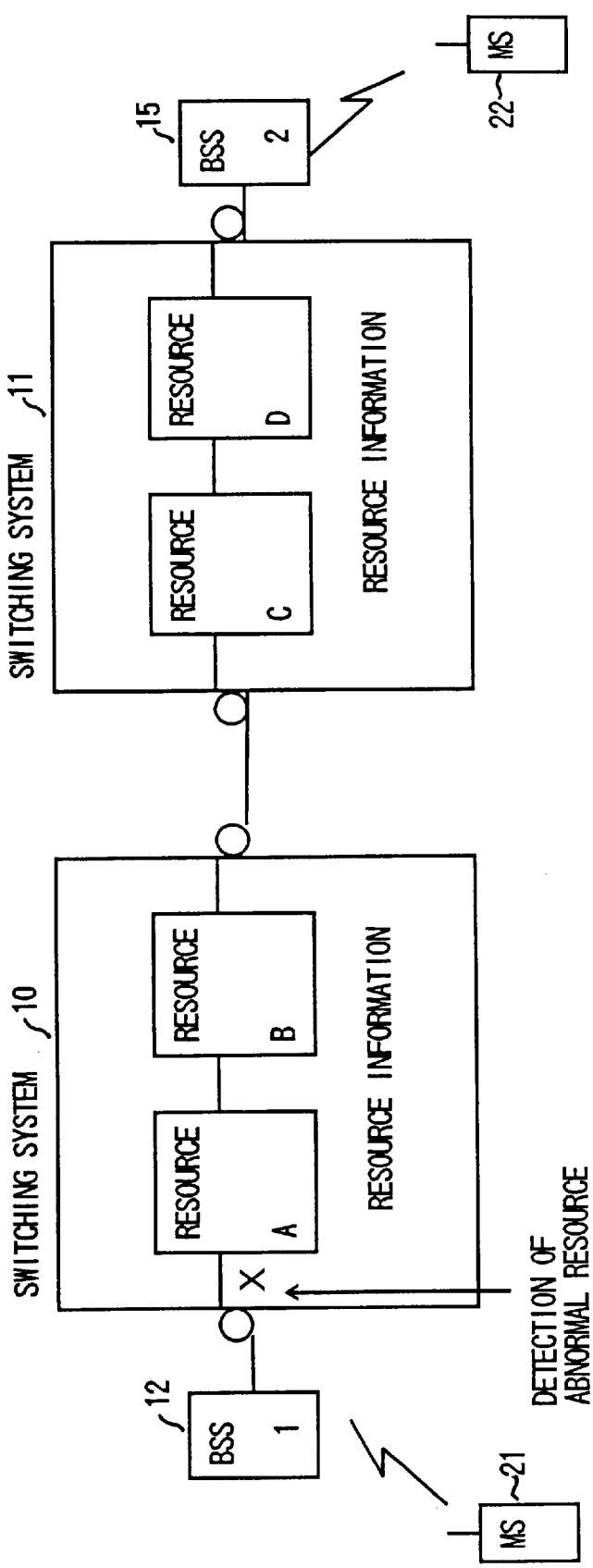
FIG. 3 is a view showing another conventional mobile communication system and resource management method thereof.
Figure 4:
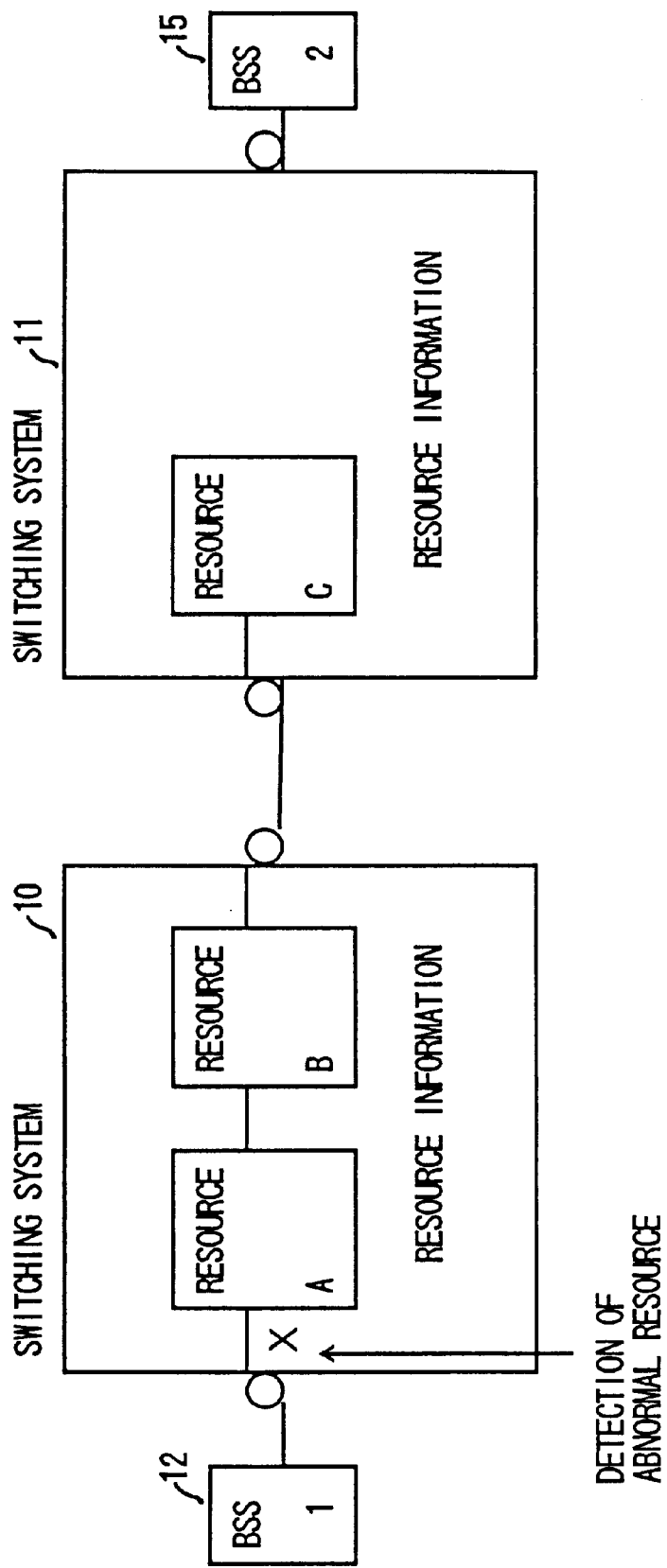
FIG. 4 is a view showing the other conventional mobile communication system and resource management method thereof.
Figure 5:
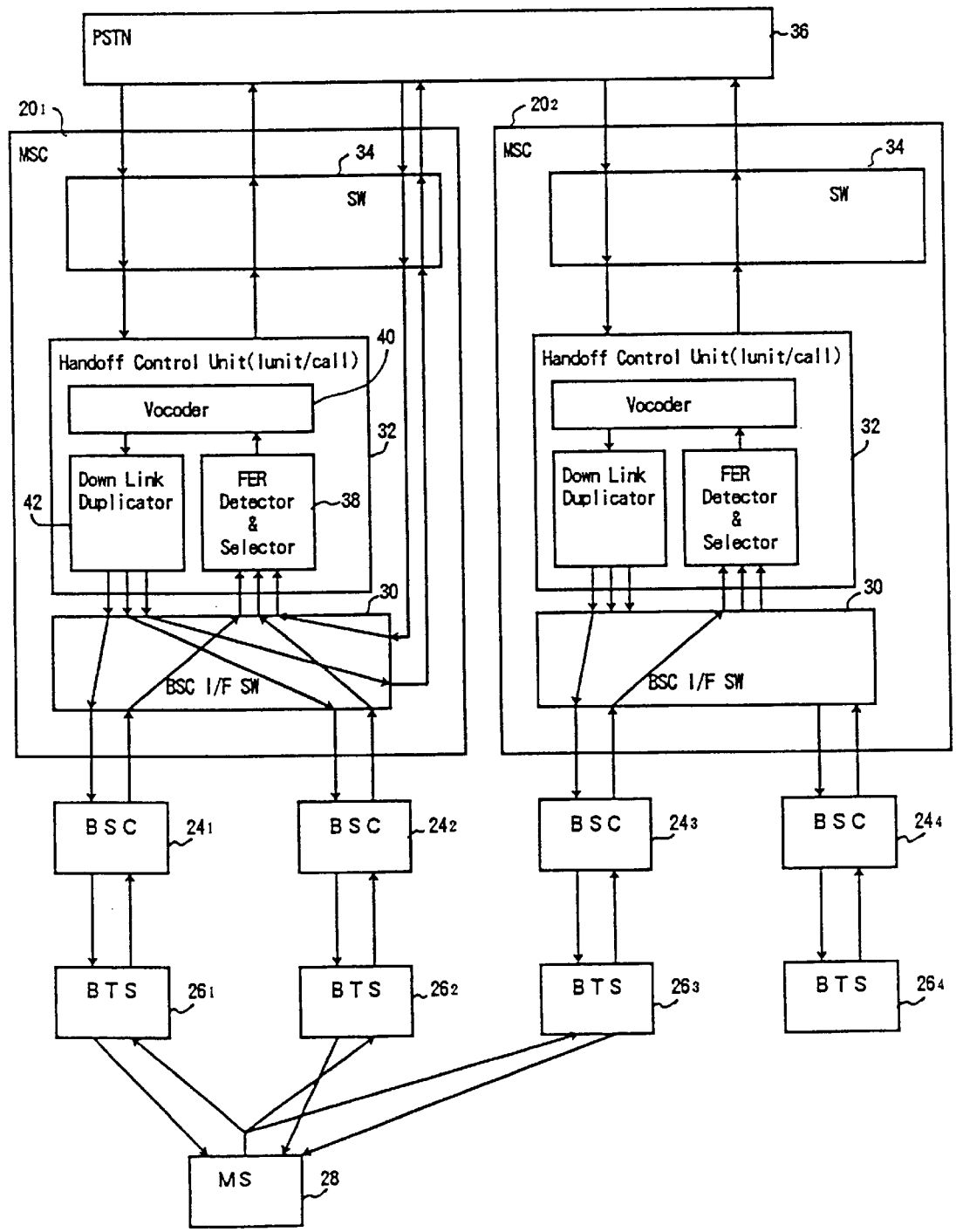
FIG. 5 is a block diagram showing an example of a CDMA mobile communication system in which an inter-station soft handoff is performed.

FIG. 5 shows a block diagram of an example of a CDMA mobile communication system in which an inter-station soft handoff is performed. In FIG. 5, the CDMA mobile communication system comprises mobile switching centers (MSC) $20_1$, $20_2$ and a base station system (BSS). The base station system consists of base station controllers (BSC) $24_1$, $24_2$, $24_3$ and $24_4$, base terminal stations (BTS) $26_1$, $26_2$, $26_3$ and $26_4$ which are controlled by the base station controllers (BSC) $24_1$, $24_2$, $24_3$ and $24_4$ respectively, and a mobile station 28.

The mobile switching center (MSC) $20_1$ ($20_2$) consists of a BSC interface switch (BSCI/FSW) 30, a handoff control unit (HCU) 32, and a switch 34. The BSC interface switch (BSCI/FSW) 30 functions to connect the base station controllers (BSC) $24_1$, $24_2$ ($24_3$, $24_4$) to the handoff control unit 32. The handoff control unit (HCU) 32 functions to control a soft handoff. The switch 34 functions to connect the handoff control unit (HCU) 32 to a public telecommunication network (PSTN) 36.

The handoff control unit 32 consists of a FER detector/selector 38, a vocoder 40 and a down link duplicator 42. The FER detector/selector 38 functions to detect error probability of radio circuits between the mobile station 28 and the handoff control unit 32 so as to select a radio circuit with the lowest error probability. The vocoder 40 functions to perform speech (voice) coding and decoding. The down link duplicator 42 functions to duplicate downstream data. In a case in which a soft handoff is performed between the base terminal stations (BTS) $26_1$ and $26_3$ which are controlled by the mobile switching centers (MSC) $20_1$ and $20_2$, the handoff is controlled by, for example, the handoff control unit 32 within the mobile switching center (MSC) $20_1$.

Figure 6:
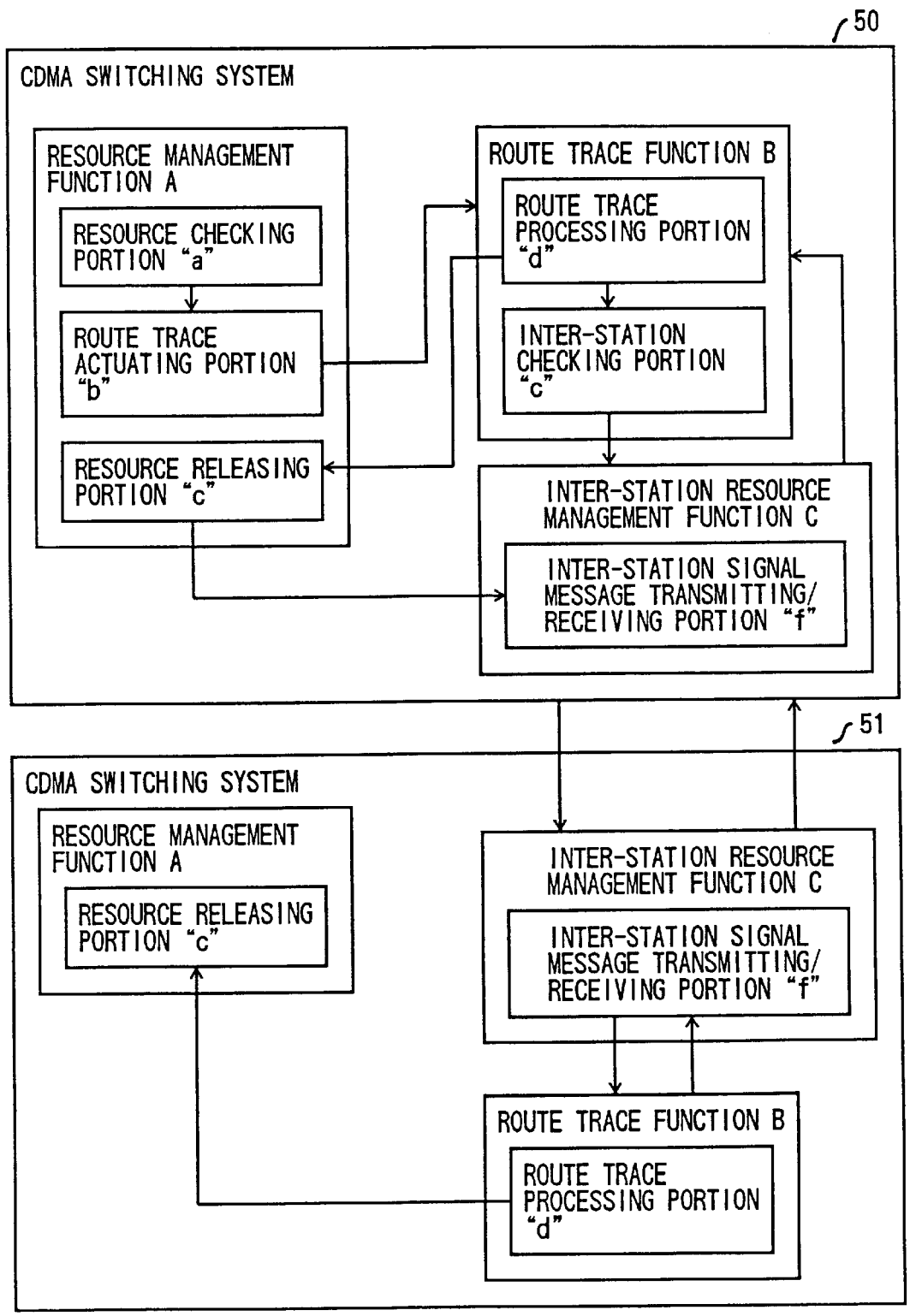
FIG. 6 is a block diagram showing an example of a route trace and resource management according to the present invention.

FIG. 6 shows a block diagram of an example of a route trace and resource management capabilities according to the present invention. In FIG. 6, CDMA switching systems 50, 51 are equivalent to the mobile switching station $20_1$ and $20_2$ in FIG. 5 respectively. Each of the CDMA switching systems 50, 51 comprises a resource management function A, a route trace function B and an inter-station resource management function C.

In the embodiment of the present invention, the CDMA switching system 50 is regarded as a local station and the CDMA switching system 51 is regarded as a remote station.

In the resource management function A of the local station 50, a resource checking portion "a" checks resources of the local station 50 every given time (for example, 12 hours). When an abnormal resource is found in the local station 50, the route trace function B is actuated by a route trace actuating portion "b" of the resource management function A. Then, the abnormal resource is released by a resource releasing portion "c" of the resource management function A according to a result of the route trace executed in the route trace function B.

The route trace actuating portion "b" of the resource management function A actuates the route trace function B and thereby a route trace processing portion "d" is actuated. The actuated route trace processing portion "d" executes a route trace by using call control information (CCB information) so as to confirm whether a call is in a correct connection as indicated by the call control information. The route trace function B judges that the resource in the local station 50 is abnormal if the call control information is interrupted on the way of the route trace, or is normal if the route trace is completed without the call control information being interrupted. If it is detected from the call control information in an inter-station checking functional portion "e" that the call extends over the two stations 50, 51 by an inter-station handoff, the inter-station resource management function C is actuated by the inter-station checking functional portion "e".

The inter-station resource management function C transmits a route trace executing signal message through an inter-station signal message transmitting/receiving portion "f" thereof to the remote station 51 of the inter-station handoff. The inter-station signal message transmitting/receiving portion "f" functions as an inter-station communication portion.

In the remote station 51, the inter-station resource management function C receives the trace executing signal message from the local station 50 and actuates the route trace processing portion "d" of the route trace function B through an inter-station signal message transmitting/receiving portion "f".

Further, in the remote station 51, the route trace processing portion "d" executes a route trace by using the call control information so as to confirm whether or not the call is correctly connected in the remote station 51 as indicated by the call control information. The inter-station signal message transmitting/receiving portion "f" transmits a result of the route trace to the inter-station resource management function C of the local station 50.

Then, in the local station 50, the inter-station resource management function C notifies the result of the route trace executed in the remote station 51 to the route trace processing portion "d" of the route trace function B. The notification is about normality/abnormality of the resources and the call control information obtained from the route trace. An abnormal resource may be a resource which is in a floating state due to omission of release, or destruction of link information (address).

The route trace function B of the local station 50 transmits the results of the route traces automatically executed in the local and remote stations 50, 51 to the resource management function A of the local station 50. If an abnormal resource is detected in the local station 50, the resource releasing portion "c" of the resource management function A releases the abnormal resource. If an abnormal resource is detected in the remote station 51 of the inter-station handoff, the abnormal resource of the remote station 51 is released such that the inter-station signal message transmitting/receiving portion "f" of the local station 50 actuates the resource releasing portion "c" of the resource management function A of the remote station 5 through the inter-station signal message transmitting/receiving portion "f" and the route trace processing portion "d" of the remote station 51.

FIG. 7 shows a block diagram of an example of route trace control according to the present invention. In the local station 50, the resource management function A checks resources therein. If an abnormal resource is detected in drift information of a calling side, the resource management function A actuates the route trace function B so as to trace call control information (CCB information) of the local station 50.

Figure 9:
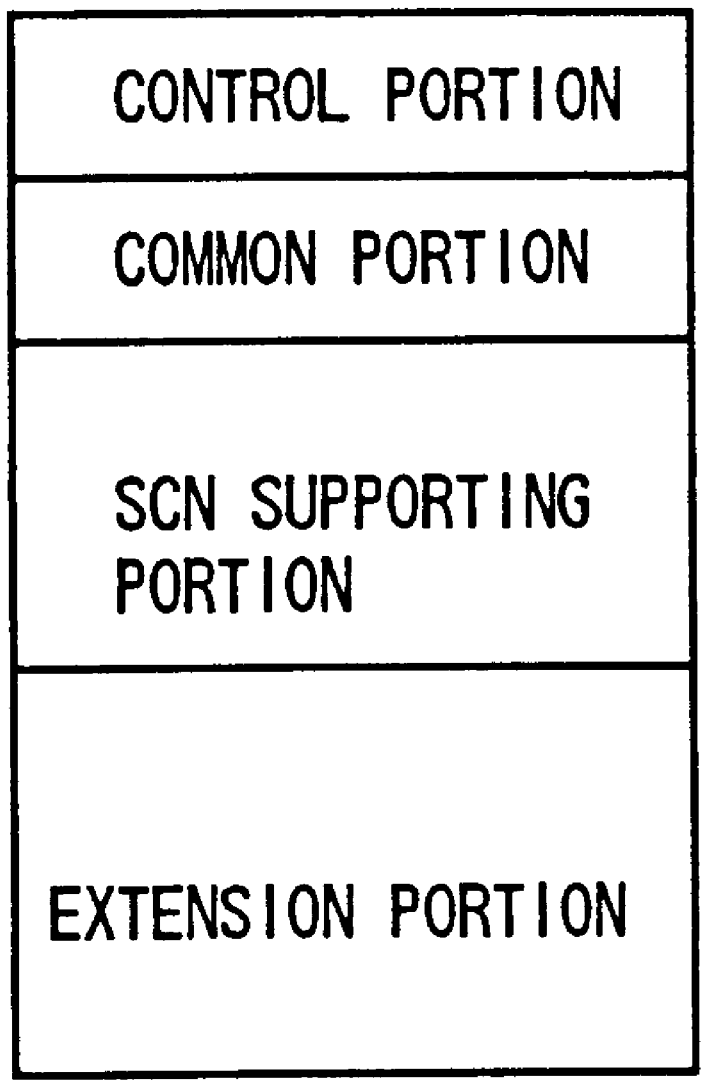
FIG. 9 is a block diagram showing a format of CCB information.

The CCB information, as shown in FIG. 9, consists of a control portion, a common portion, a SCN supporting portion and an extension portion. The control portion contains identification numbers of anchor/drift and the like.

The common portion contains TI information (terminal number) of the call control information, path information (call connection number) and CR number information (CR is a call control information number). For example, the common portion may contain address information regarding from which address the TI information begins, etc.

The SCN supporting portion contains control information for deciding, from TI information of the extension portion, to which TI information the TI information is connected, or which call control information is used, in a case of executing a route trace from various information of the extension portion, for example, from the drift information to the anchor information.

The extension portion contains TI information of the call control information, the path information and CR number information. This information are basic information outputted by the route trace. In the route trace, a CCB information address of a link head of the extension portion is used to seek the next CCB information.

The call control information consists of anchor information as fixed information and drift information as variable information which are contained in both of a calling side and an accepting side of mobile stations. The route trace function B of calling-side drift information 52 uses a call control program 53 to seek trunk information from CCB resources 54 of the calling-side drift information 52. The trunk information connects the calling-side drift information 52 and the calling-side anchor information 58 of an abnormal resource. Then from the trunk information, the route trace function B traces trunks 55, 56 to seek a connection resource of the calling-side anchor information 58.

Further, the route trace function B of the calling-side anchor information 58 uses the call control program 53 to seek inter-station trunk information from CCB resources 59. The inter-station trunk information connects the calling-side anchor information 58 and accepting-side drift information 62. Then from inter-station trunk information, the route trace function B traces inter-station trunks 60, 61 to seek a connection resource of the accepting-side anchor information 62 of the remote station 51. After that, the route trace function B actuates the inter-station resource management function C so as to transmit a trace executing signal message to the remote station 51.

The route trace function B of the remote station 51 uses a call control program 63 to seek trunk information from CCB resources 64 of the accepting-side drift information 62. The trunk information connects the accepting-side drift information 62 and accepting-side anchor information 68. Then from the trunk information, the route trace function B traces trunks 65, 66 to seek a connection resource of the accepting-side anchor information 68.

Further, the route trace function B uses the call control program 63 to trace the accepting-side anchor information 68 from CCB resources 69. The route trace function B of the remote station 51 actuates the inter-station resource management function C to transmit a trace result signal message to the local station 50 so as to notify the route trace function B of the local station 50.

FIG. 8 shows a block diagram of an example of resource releasing control according to the present invention. In the CDMA switching system 50 which is regarded as the local station, the route trace function B notifies a route trace result to the resource management function A. If the route trace result indicates that an abnormal resource is found in the local station 50, the resource management function A actuates the resource releasing portion "c" thereof to release the abnormal resource from CCB resources 71 of calling side resource information 70.

Then, the resource management function A actuates the inter-station resource management function C to transmit a resource releasing signal message to the CDMA switching system 51 which is regarded as the remote station. Thus, the resource management function A of the remote station 51 actuates the resource releasing portion "c" thereof to release the abnormal resource from CCB resources 76 of accepting-side resource information 75.

Figure 10A:
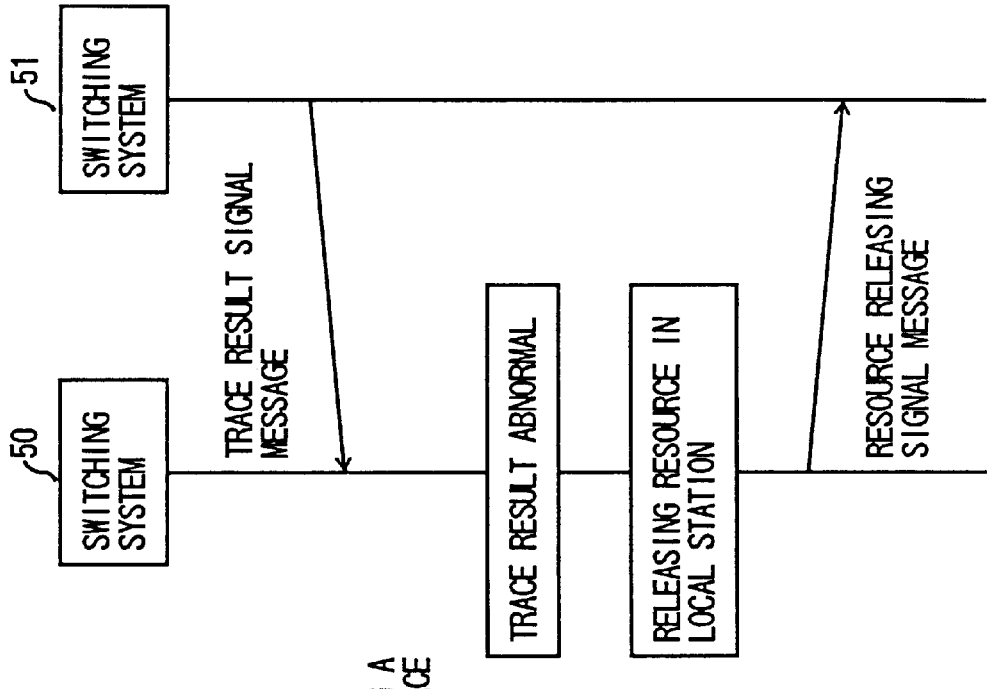
FIG. 10A is a view showing an example of a sequence of performing the inter-station route trace according to the present invention.

FIG. 10A shows an example of a sequence of executing the inter-station route trace according to the present invention. In a case in which a trace executing signal message indicates that an abnormal resource is detected by the resource checking portion "a" of the local station 50 and thereby the route trace function B is actuated, or, in a case in which a maintainer performs a route trace, inter-station call control is transmitted to the remote station 51. Then, after the route trace is executed in the remote station 51, a trace result signal message as an answer to the trace executing signal message is transmitted to the local station 50.

Figure 10B:
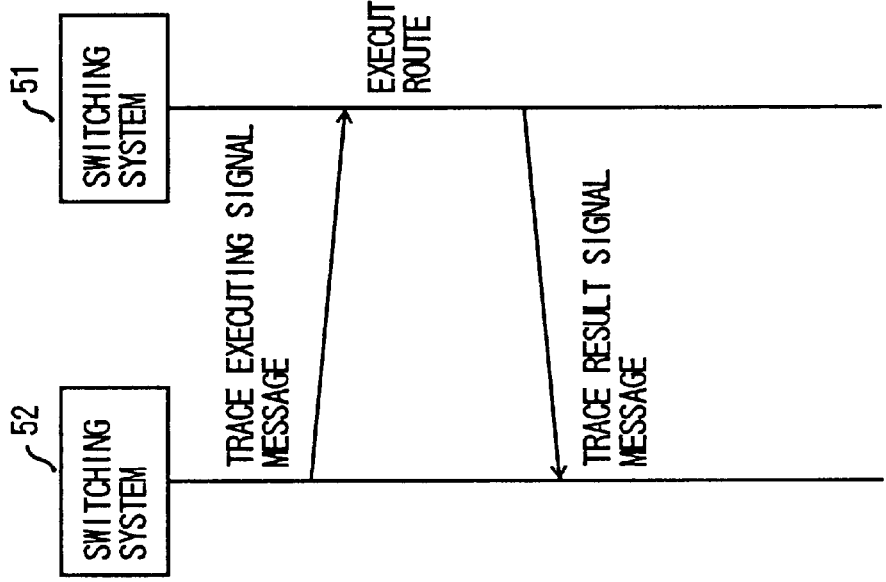
FIG. 10B is a view showing an example of a sequence of releasing a resource according to the present invention.

FIG. 10B shows an example of a sequence of releasing an inter-station resource according to the present invention. When the trace result signal message from the remote station 51 is transmitted to the local station 50, the local station 50 confirms the trace result. If the trace result shows that an abnormal resource is found in the local station 50, the local station 50 releases the abnormal resource thereof and then transmits a resource releasing signal message to the remote station 51 so as to release the abnormal resource in the remote station 51.

Figure 11:
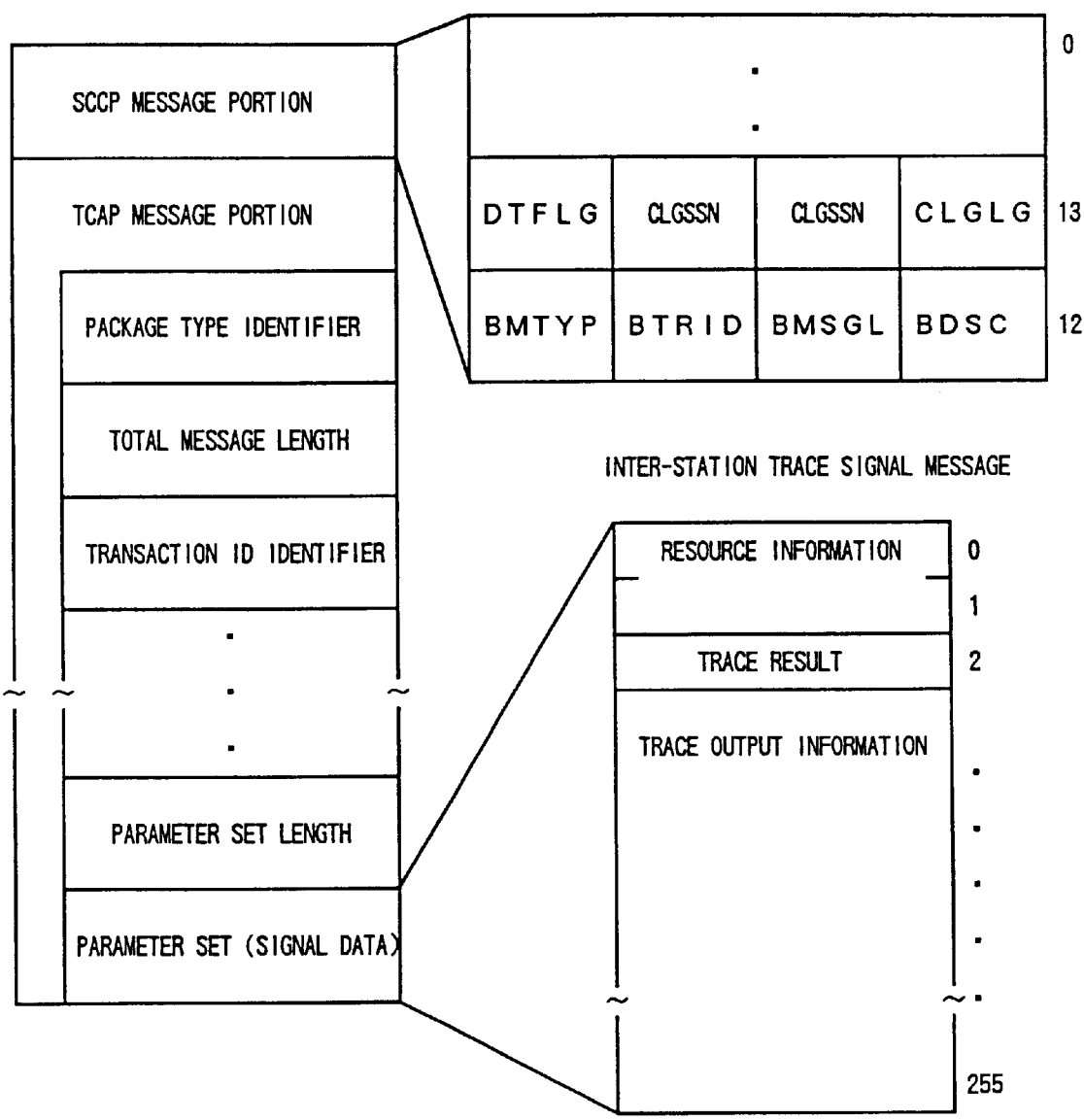
FIG. 11 is a block diagram showing an example of a format of a trace executing signal message and a trace result signal message according to the present invention.

FIG. 11 shows a block diagram of an example of a format of a trace execution signal message and a trace result signal message according to the present invention. An SCCP message portion (SCCP: Signaling Connection Control Part) contains various information such as DTFLG (data field), CLGSSN (subsystem number of calling party), CLGLG (calling party length), BMTYP (message type), BTRID (transaction ID), BMSLG (message length), BDSC (sidcribution subsystem NO), and the like. The BMTYP contains a code showing inter-station trace messages including a trace executing signal message and a trace result signal message. DTFLG~BDSC are information for seeking a position of BMTYP.

A TCAP message portion (TCAP: Transaction Capabilities Application Part) contains a package type identifier, a total message length, a transaction ID identifier, a parameter set length, and a parameter set. The parameter set functions to respectively set a trunk number or resource information of a trunk location number, a trace result effective in a trace result signal message, and trace output information generated when a route trace effective in the trace result signal message is normally completed.

FIG. 12 shows a block diagram of an example of a format of a resource release signal message according to the present invention. A SCCP message portion contains various information such as DTFLG, CLGSSN, CLGLG, BMTYP (message type), BTRID, BMSLG, BDSC, and the like. The BMTYP contains a code showing a resource release message. A TCAP message portion contains a package type identifier, a total message length, a transaction ID identifier, a parameter set length, and a parameter set. The parameter set functions to respectively set a trunk number of resource to be released, or resource information of a trunk location number.

Figure 13:
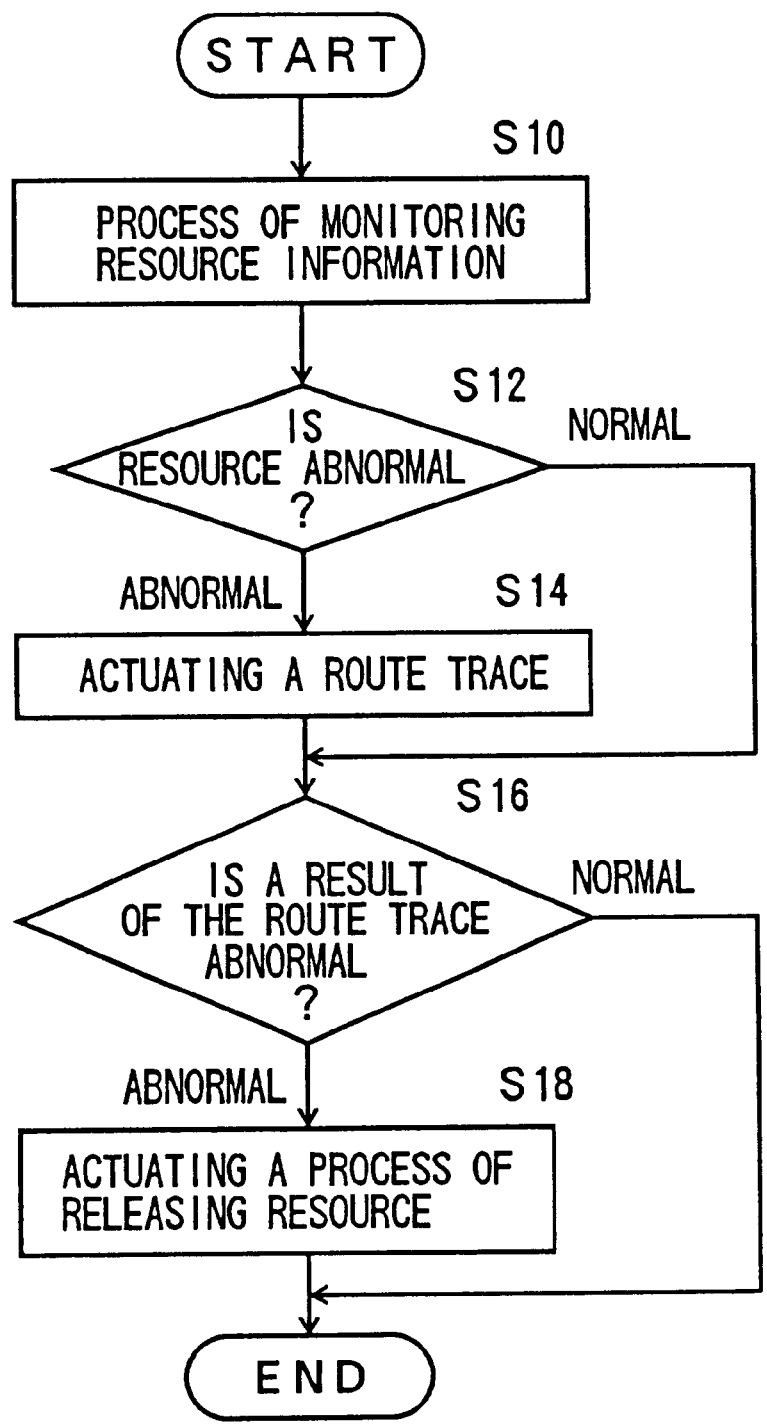
FIG. 13 is a flowchart showing an example of a process of executing a resource management function A according to the present invention.

FIG. 13 shows a flowchart of an example of a process of executing resource management function A according to the present invention. In Step 10, all of resource information of the local station 50 is monitored, and in Step 11, it is judged whether the resource information is normal or not. If an abnormal resource is found in the local station 50, the process goes to Step 14, and if no abnormal resource is found in the local station 50, the process goes to Step 16.

In Step 14, a route trace is actuated and then the process goes to Step 16 to judge whether a result of the route trace is abnormal or not. If the trace result is normal, the process ends. If the trace result is abnormal, the process goes to Step 18 to actuate a resource releasing process and then goes to the end.

Figure 14:
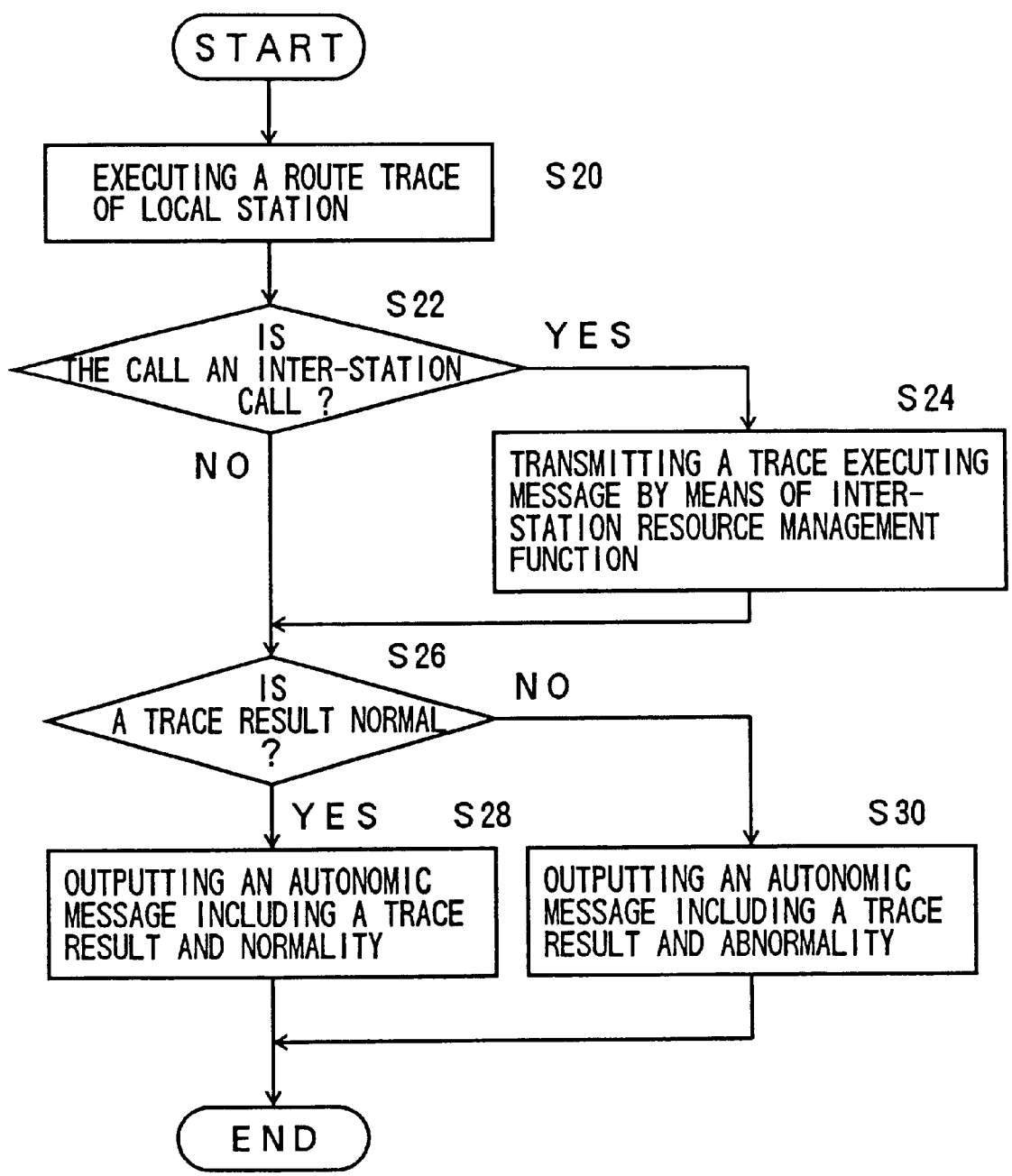
FIG. 14 is a flowchart showing an example of a process of executing a route trace function B according to the present invention.

FIG. 14 show a flowchart of an example of a process of executing the route trace function B according to the present invention. In Step 20, a route trace is executed in the local station 50. In Step 22 it is judged whether call control extends over two stations. If the call control is extending over the two stations, the process goes to Step 24 in which the inter-station resource management function C is actuated to transmit a trace executing signal message to the remote station 51 of the two stations and then goes to Step 26. If the call control is not extending over the two stations, the process goes directly to Step 26.

In Step 26, it is judged whether a result of the route trace is normal or not. If the trace result is normal, the process goes to Step 28 in which an autonomic message including the trace result and normality is outputted. If the trace result is abnormal, the process goes to Step 30 in which an autonomic message including the trace result and abnormality is outputted.

Figure 15:
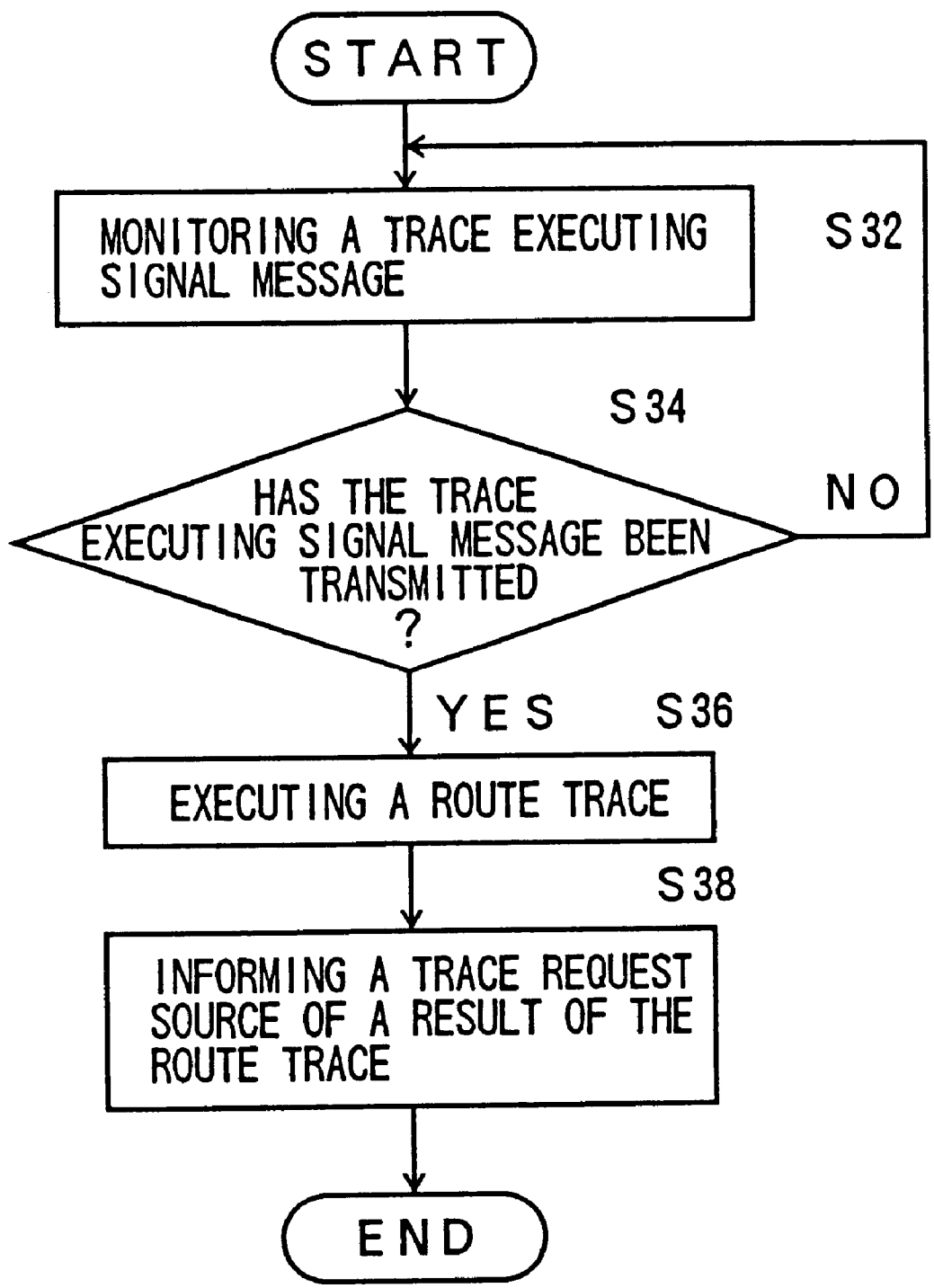
FIG. 15 is a flowchart showing an example of a signal-receiving process of executing an inter-station resource management function C according to the present invention.

FIG. 15 shows a flowchart of an example of a signal-receiving process of executing the inter-station resource management function C according to the present invention. In Step 32, it is monitored whether a trace executing signal message is transmitted from the remote station. In Step 34 it is judged whether the trace executing signal message has been transmitted or not, and if the message has been received, the process goes to Step 36 from Step 34. In Step 36, a route trace of the local station is executed and then the process goes to Step 38. In Step 38, a trace result is transmitted to a trace-request source by a trace result signal message, and thus the process ends.

Figure 16:
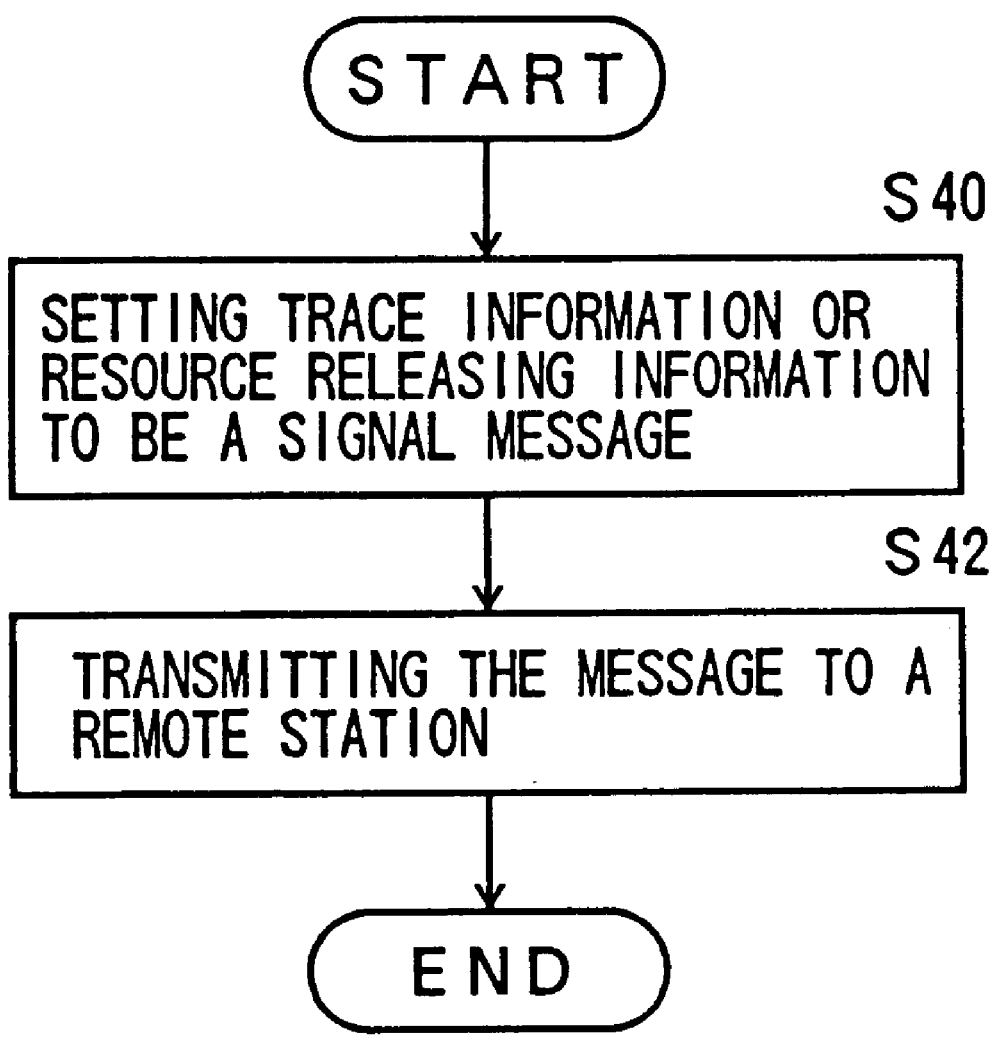
FIG. 16 is a flowchart showing an example of a signal-transmitting process of executing the inter-station resource management function C according to the present invention.

FIG. 16 shows a flowchart of an example of a signal-transmitting process of executing the inter-station resource management function C according to the present invention. In Step 40, a trace resource of a trace executing signal message or trace result signal message, or resource releasing information, is set to be a signal message. In Step 42 the signal message is transmitted to the remote station 51, and thus the process ends.

Figure 17:
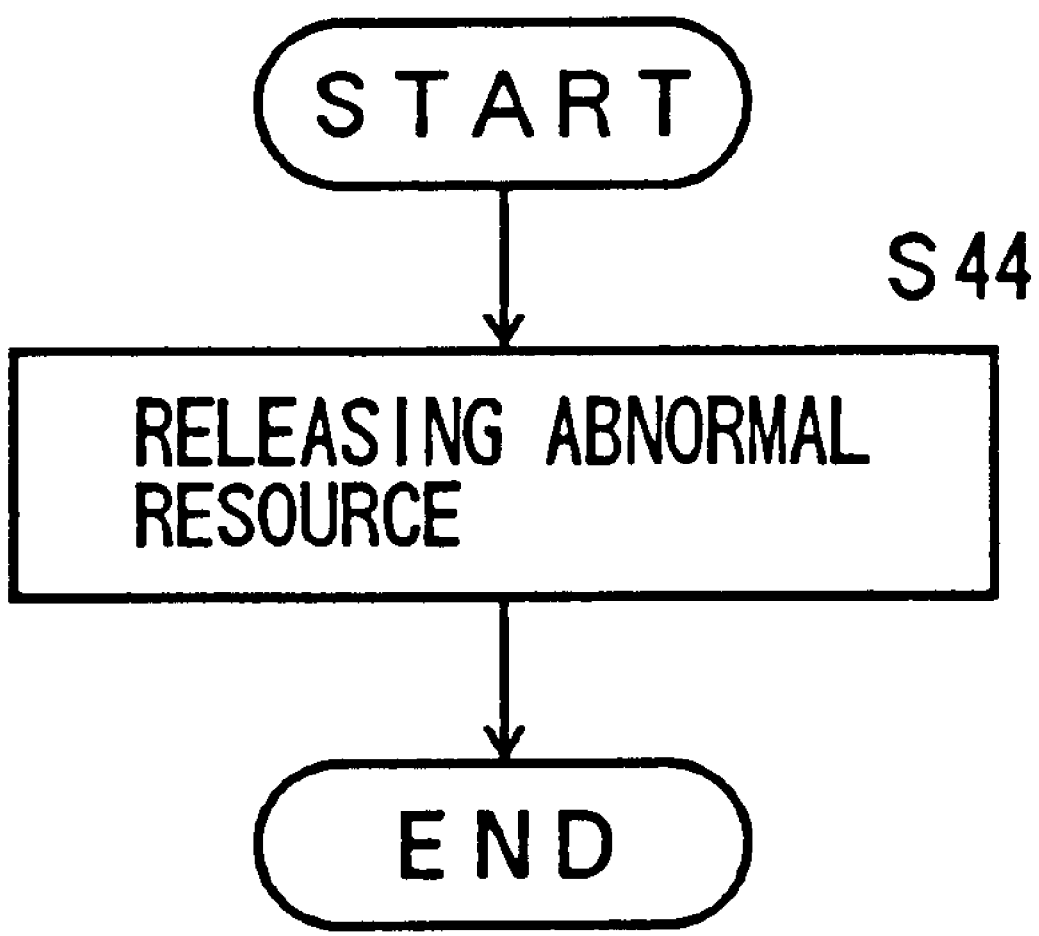
FIG. 17 is a flowchart showing an example of a process of executing a resource releasing portion "c" of the resource management function A according to the present invention.

FIG. 17 shows a flowchart of an example of a process of executing the resource releasing portion "c" of the resource management function A according to the present invention. In Step 44, a resource indicated by the resource releasing information is released and thus the process ends.

The above-mentioned examples of the present invention are directed to the use of the type of CDMA which performs soft handoffs. However, the present invention is not limited to the type of CDMA and is also suitable to the type of FDMA which only performs a handoff and the like.

The present invention is not limited to the specifically disclosed examples, and variations and modifications may be made without departing from the scope of the present invention.

What is claimed is:

1. A mobile communication system for performing an inter-station handoff extending over a plurality of switching centers, the mobile communication system comprising:

a route trace processing portion which actuates a route trace so as to trace resources of call control in a local station;

an inter-station checking functional portion in which said resource is checked as to whether or not said resource becomes an inter-station resource by said inter-station handoff; and an inter-station communication portion which notifies a remote station to execute a route trace when said resource becomes said inter-station resource and receives a result of said route trace from said remote station.

2. The mobile communication system as claimed in claim 1, further comprising a resource releasing portion which releases an abnormal resource detected according to said route trace result.

3. The mobile communication system as claimed in claim 2, wherein said resource releasing portion notifies said remote station through said inter-station communication portion so as to release an abnormal resource detected according to said route trace result from said remote station.

4. The mobile communication system as claimed in claim 3, further comprising a resource checking portion which checks said resource and a route trace actuating portion which actuates said route trace if said resource is checked as being abnormal.

5. A resource management method of a mobile communication system for performing an inter-station handoff extending over a plurality of switching centers, said method comprising the steps of:

a) actuating a route trace so as to trace resources of call control in a local station;

b) checking whether or not said resource becomes an inter-station resource by said inter-station handoff; and c) notifying a remote station to execute a route trace when said resource becomes said inter-station resource and receiving a result of said route trace from said remote station.

6. The resource management method as claimed in claim 5, comprising the step of d) releasing an abnormal resource detected by said route trace result.

7. The resource management method as claimed in claim 6, comprising the step of e) notifying said remote station so as to release an abnormal resource detected by said route trace result from said remote station.

8. The resource management method as claimed in claim 7, comprising the step of f) checking whether or not said resource is abnormal and actuating said route trace in said local station if said resource is abnormal.

* * * * *